(12) United States Patent
Shani et al.

(10) Patent No.: US 10,534,700 B2
(45) Date of Patent: Jan. 14, 2020

(54) SEPARATING TEST VERIFICATIONS FROM TEST EXECUTIONS

(71) Applicant: HEWLETT PACKARD ENTERPRISE DEVELOPMENT LP, Houston, TX (US)

(72) Inventors: Inbar Shani, Yehud (IL); Ilan Shufer, Yehud (IL); Amichai Nitsan, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 201 days.

(21) Appl. No.: 15/508,710

(22) PCT Filed: Dec. 9, 2014

(86) PCT No.: PCT/US2014/069290
§ 371 (c)(1),
(2) Date: Mar. 3, 2017

(87) PCT Pub. No.: WO2016/093803
PCT Pub. Date: Jun. 16, 2016

(65) Prior Publication Data
US 2017/0293551 A1  Oct. 12, 2017

(51) Int. Cl.
*G06F 11/36* (2006.01)
(52) U.S. Cl.
CPC ...... *G06F 11/3692* (2013.01); *G06F 11/3608* (2013.01)
(58) Field of Classification Search
None
See application file for complete search history.

(56) References Cited

U.S. PATENT DOCUMENTS 7,398,469 B2 * 7/2008 Kisamore ........... G06F 11/3688
714/E11.208
8,024,299 B2 * 9/2011 Dias ....................... G06F 16/20
707/660

(Continued)

FOREIGN PATENT DOCUMENTS

JP  H04336629 A    11/1992
JP  H08083197      3/1996

(Continued)

OTHER PUBLICATIONS

Agile Support Team, "Web Applications Performance Testing Metrics," (Web Page), Feb. 18, 2013, 8 pages, available at http://www.agileload.com/agilebad/blog/2013/02/18/web-applications-performance-testing-metrics.

(Continued)

*Primary Examiner* — Isaac T Tecklu

(57) ABSTRACT

Example implementations relate to separating verifications from test executions. Some implementations may include a data capture engine that captures data points during test executions of the application under test. The data points may include, for example, application data, test data, and environment data. Additionally, some implementations may include a data correlation engine that correlates each of the data points with a particular test execution state of the application under test based on a sequence of events that occurred during the particular test execution state. Furthermore, some implementations may also include a test verification engine that, based on the correlation of the data points, verifies an actual behavior of the application under test separately from the particular test execution state.

15 Claims, 6 Drawing Sheets

(56) References Cited

U.S. PATENT DOCUMENTS

| | | | | |
|---|---|---|---|---|
| 8,180,724 | B1* | 5/2012 | Qureshi | G06F 11/079 706/50 |
| 8,615,739 | B2* | 12/2013 | Nir | G06F 11/3688 717/124 |
| 8,756,586 | B2* | 6/2014 | Khanapurkar | G06F 11/3414 717/130 |
| 9,727,447 | B1* | 8/2017 | Elgarat | G06F 11/3672 |
| 2006/0059444 | A1* | 3/2006 | Murthy | G06F 17/5009 716/106 |
| 2006/0248405 | A1* | 11/2006 | Ponczak | G06F 11/3664 714/38.1 |
| 2007/0101196 | A1* | 5/2007 | Rogers | G06F 11/3664 714/38.14 |
| 2009/0083325 | A1* | 3/2009 | Belide | G06F 11/3688 |
| 2011/0202901 | A1* | 8/2011 | Givoni | G06F 11/3414 717/125 |
| 2012/0192153 | A1* | 7/2012 | Venkatraman | G06F 11/3664 717/124 |
| 2013/0055029 | A1* | 2/2013 | Lawrance | G06F 11/3684 714/38.1 |
| 2013/0246853 | A1* | 9/2013 | Salame | G06F 11/079 714/37 |
| 2014/0059522 | A1* | 2/2014 | Chandra | G06F 11/3684 717/126 |
| 2014/0109063 | A1* | 4/2014 | Schissel | G06F 11/368 717/127 |
| 2014/0282425 | A1* | 9/2014 | Zhao | G06F 11/3688 717/127 |
| 2015/0347282 | A1* | 12/2015 | Wingfors | G06F 11/3688 717/125 |

FOREIGN PATENT DOCUMENTS

| | | |
|---|---|---|
| JP | 2008203964 A | 9/2008 |
| JP | 2008537222 A | 9/2008 |
| JP | 2009134673 A | 6/2009 |
| JP | 2010218452 A | 9/2010 |
| JP | 2013045326 A | 3/2013 |
| WO | WO-2010044797 A1 | 4/2010 |

OTHER PUBLICATIONS

International Search Report & Written Opinion received in PCT Application No. PCT/US2014/069290, dated Aug. 3, 2015, 12 pages.

Gerie Owen, "App performance monitoring closes gap between testing and production", Published online on Feb. 2014, 7 pages. Retrieved from the Internet on Oct. 23, 2018. <<https://searchsoftwarequality.techtarget.com/tip/App-performance-monitoring-closes-gap-between-testing-and-production>.

Software Testing Help, "Test Result Analysis and Reports—Load Testing with LoadRunner Tutorial #8", Jan. 16, 2014, 6 pages. Retrieved from the Internet on Oct. 23, 2018. <https://web.archive.org/web/20140116043522/https://www.softwaretestinghelp.com/loadrunner/hp-loadrunner-tutorial-8/>.

WikipediA, "Directed acyclic graph", retrieved from the Internet on Aug. 23, 2018, 12 pages. <https://en.wikipedia.org/wiki/Directed_acyclic_graph#Causal_structures>.

* cited by examiner

SEPARATING TEST VERIFICATIONS FROM TEST EXECUTIONS

BACKGROUND

Application testing may be performed to provide information about an application under test ("AUT"). For example, application testing may be performed to determine whether the AUT includes any errors or other defects. While various techniques are available for application testing, basic application testing procedures may involve two main types of test steps: (1) action steps which manipulate, drive, or query an application under test ("AUT"); and (2) verification steps which verify the expected outcomes associated with the action steps.

BRIEF DESCRIPTION OF THE DRAWINGS

The following detailed description references the drawings, wherein.

DETAILED DESCRIPTION

Figure 1:
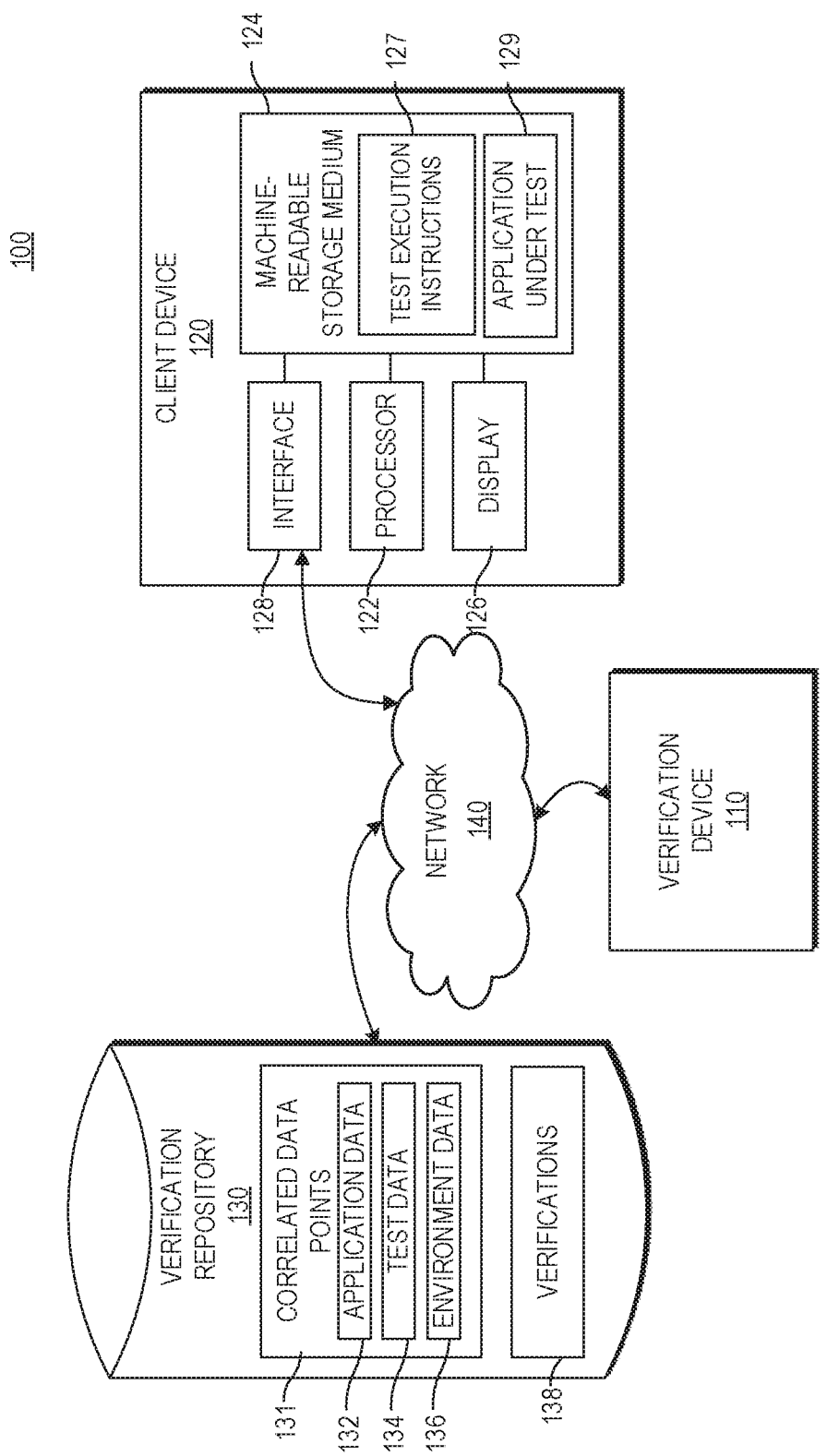
FIG. 1 is a block diagram of an example system for separating test verifications from test executions consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As discussed above, basic application testing procedures may involve two main types of test steps: (1) action or test steps which manipulate, drive, or query an application under test ("AUT"); and (2) verification steps which verify the expected outcomes associated with the action steps. Traditionally, this basic application testing procedure may create a dependency between the actions and verifications. For example, the verifications may need to be performed during the execution of the test of the AUT. This dependency may have several shortcomings, including the need to re-run a test execution of an AUT when the verification changes (even if the actions have not changed), a tendency to only verify what is being acted upon (e.g., if the action is to click a button, a user will verify that the button has been clicked), difficulty correlating action step outcomes with events at other levels of the AUT (e.g., server logs, database logs, application logs, etc.), and various maintenance challenges based on changed actions and/or changed verifications. For example, consider the case where an AUT is a banking application and the test case is determining whether funds are transferred from a first account ("Account A") to a second account ("Account B"). A tester may execute the test case to perform the fund transfer and verify that the transferred amount is indeed added to Account B. After completing the test, the tester has decided that another verification is required—verifying that the transferred amount is removed from Account A. To execute that new verification however, the tester must re-run each of the action steps, even though they are the same steps as before. Accordingly, some traditional methods of testing closely tie action steps with verification steps, and thus do not allow the separation of verification from test execution.

Examples disclosed herein may augment or replace traditional application testing by separating test verifications from test executions. To this end, some examples may monitor and capture data points from test executions of an AUT as well as define, persist, and execute queries of these date points. The queries may be considered to be a new method of defining expected application behavior, and may serve as the verification steps in traditional scripts. For example, examples consistent with disclosed implementations may capture data points during test executions of an AUT, correlate each of the data points with a particular test execution state of the AUT (e.g., a state of the system at a particular points in time), and verify, based on the correlation of the data points, an actual behavior of the AUT separately from a particular test execution state. As used herein, an particular test execution state may be a state of the Referring now to the drawings, FIG. 1 is a block diagram of an example system 100 for separating test verifications from test executions. System 100 may be implemented in a number of different configurations without departing from the scope of the disclosed examples. In the example shown in FIG. 1, system 100 may include a verification 110, a client device 120, a verification repository 130, and a network 140 for connecting verification device 110 with client device 120 and/or verification repository 130.

Verification device 110 may be a computing system that performs various functions consistent with disclosed examples. For example, verification device 110 may be a server, a desktop computer, a laptop computer, and/or any other suitable type of computing device. In some examples, verification device 110 may process information received from client device 120 and/or verification repository 130. For example, verification device 110 may verify an actual behavior of the AUT separately from a particular test execution state based on data captured from client device 120 and/or received from verification repository 130. Examples of verification device 110 and certain functions that may be performed by device 110 are described in greater detail below with respect to, for example, FIGS. 2 and 3.

Client device 120 may be a computing system operated by a user. For example, client device 120 may be a desktop computer, a laptop computer, a tablet computing device, a mobile phone, a server, and/or any other type of computing device. In some examples, client device 120 may be a computing device to perform operations consistent with certain disclosed implementations. For example, client device 120 may be adapted to transmit data related to test executions of an AUT to verification device 110, such as, for example, data related to action steps performed during application testing.

Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as test execution application instructions 127 and/or AUT instructions 129) to test an AUT. While in the example shown in FIG. 1 the AUT resides on client device 120, test execution instructions 127 and/or the AUT 129 may reside on different machines and/or may span multiple computing devices or systems. Machine-readable storage medium 124 may be any electronic, magnetic, optical, or other non-transitory storage device that stores instructions executed by processor 122. Display device 126 may be any type of display device that presents information, such as a user interface of an AUT, to a user (e.g., a tester) operating client device 120. Interface device 128 may be any combination of hardware and/or programming that facilitates the exchange of data between the internal components of client device 120 and external components, such as user action verification device 110. In some examples, interface device 128 may include a network interface device that allows client device 120 to receive and send data to and from various components, such as to and from verification device 110 via network 140.

Verification repository 130 may be any type of storage system configuration that facilitates the storage of data. For example, verification repository 130 may facilitate the locating, accessing, and retrieving of data points captured during test executions of an AUT (e.g., SaaS, SQL, Access, etc. databases). Verification repository 130 can be populated by a number of methods. For example, verification device 110 may populate verification repository 130 by receiving, generating, and/or otherwise accessing a set of verifications and storing the set of verifications in verification repository 130. As another example, verification device 110 may populate verification repository 130 with data points captured and correlated by verification device 110, and store the correlated data points in verification repository 130. In some implementations, the data points may be stored as a directed acyclic graph ("DAG"). Traditionally, a DAG is a directed graph formed by a collection of vertices (e.g., a fundamental unit of which the graph is formed) and directed edges (e.g., an edge that points from a first vertex in the collection of vertices to a second vertex in the collection of vertices). A DAG, as used herein, doesn't necessarily mean a graphic representation of the data included in a traditional DAG. Instead, a DAG as used herein may include the graphic representation and/or a data structure that stores the data points in a manner that allows system 100 to determine data represented by the traditional DAG (e.g., categorization of the data points, directed edges associated with particular data points, and/or vertices associated with the data points). In some examples, the data structure may be an array, a record, a database entry, a lookup table, a hash table, a map, a tree, a linked list, and/or any other type of data structure. An example of a DAG consistent with disclosed implementations is discussed in more detail below with respect to, for example, FIG. 5.

While in the example shown in FIG. 1 verification repository 130 is a single component external to components 110 and 120, verification repository 130 may comprise separate components and/or may be part of devices 110, 120, and/or another device. In some implementations, verification repository 130 may be managed by components of device 110 and/or other devices that are capable of accessing, creating, controlling and/or otherwise managing data remotely through network 140.

Network 140 may be any type of network that facilitates communication between remote components, such as verification device 110 and client device 120. For example, network 140 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1 shows one verification device 110, client device 120, verification repository 130, and network 140, system 100 may include any number of components 110, 120, 130, and 140, as well as other components not depicted in FIG. 1. For example, system 100 may omit any of components 110, 120, 130, and 140, and/or the functionality of at least one of components 110, 120, 130, and 140 may be incorporated into another component (e.g., components 110, 120, 130, 140, and/or a component not shown in FIG. 1).

Figure 2:
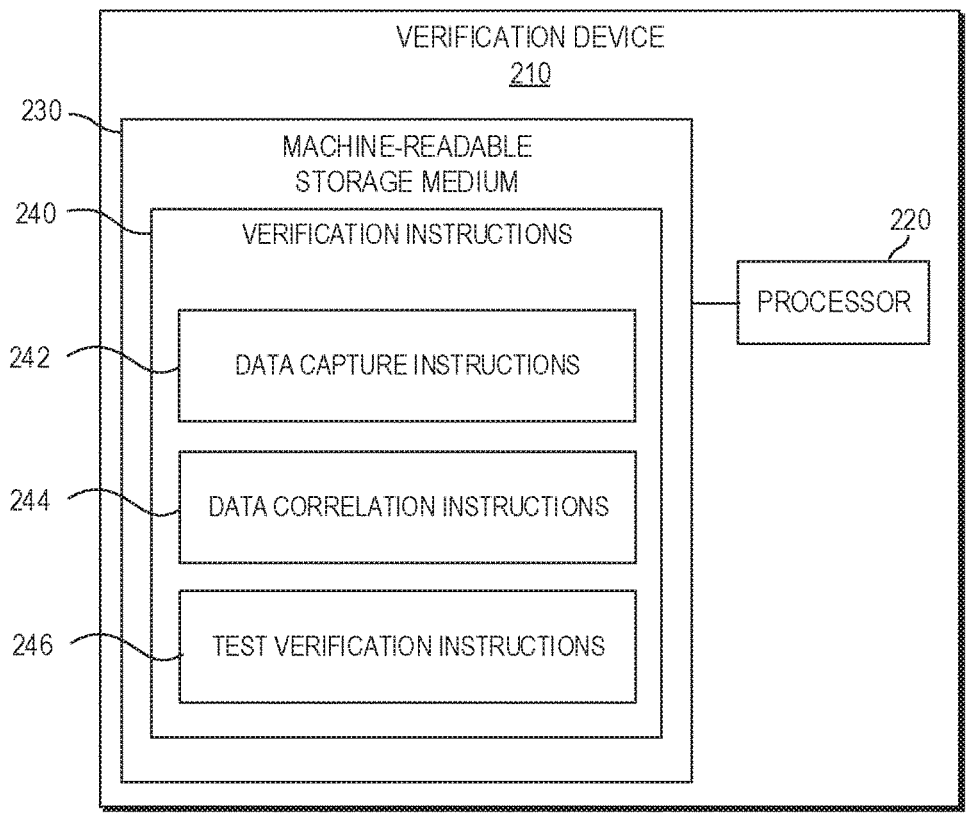
FIG. 2 is a block diagram of an example verification device consistent with disclosed implementations.

FIG. 2 is a block diagram of an example verification device 210 consistent with disclosed implementations. In certain aspects, verification device 210 may correspond to verification device 110 of FIG. 1. Verification device 210 may be implemented in various ways. For example, device 210 may be a special purpose computer, a server, a mainframe computer, and/or any other type of computing device. In the example shown in FIG. 2, relation device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute verification instructions 240 (e.g., instructions 242, 244, and/or 246) stored in machine-readable storage medium 230 to perform operations consistent with disclosed examples.

Machine-readable storage medium 230 may be any electronic, magnetic, optical, or other physical storage device that stores executable instructions. Thus, machine-readable storage medium 230 may be, for example, memory, a storage drive, an optical disc, and the like. In some implementations, machine-readable storage medium 230 may be a non-transitory computer-readable storage medium, where the term "non-transitory" does not encompass transitory propagating signals. Machine-readable storage medium 230 may be encoded with instructions that, when executed by processor 230, perform operations consistent with disclosed implementations. For example, machine-readable storage medium 240 may include instructions that perform operations to separate test verifications from test executions by capturing data points during test executions of an AUT, correlating each of the data points with a particular test execution state of the AUT, and verifying an actual behavior of the AUT based on the correlation of the data points. In the example shown in FIG. 2, machine-readable storage medium 230 may include data capture instructions 242, data correlation instructions 244, and test verification instructions 246.

Data capture instructions 242 may function to capture data points during test executions of an AUT. In some implementations, when data capture instructions 242 are executed by processor 220, data capture instructions 242 may cause processor 220 and/or another processor to capture data points during test executions of the AUT. The data points may be related to the test executions, the AUT during the test executions, and the environment of the AUT during the test executions. For example, data capture instructions 242 may cause processor 220 and/or another processor to access, receive, or otherwise obtain the data points from one or more computing systems that execute the test and/or implement the AUT during the test executions. In some examples, the data points may be captured by installing agents on various physical or virtual system components to monitor how the particular component(s) function and to transmit the data points to a storage device, such as a storage device associated with verification device 110. The transmitted data points may then be received and/or captured by verification device 110. The agents may be simple (e.g., agents monitoring a central processing unit ("CPU") that may simply ask an operating system what the CPU use level is) or complex (e.g., agents integrated with a testing tool that follow all of the test steps during test executions of an AUT). Alternatively (or in combination with the use of agents) the information may be monitored agentlessly. For example, a monitoring server may query various component(s) for information about the component(s) memory usage.

In some implementations, the captured data points may include data related to various levels of the AUT, such as a user interface level (e.g., UI snapshots, UI object extractions, etc.), a code level (e.g., code executed behind the UI), a network communication level (e.g., network communications between client device 120 and verification device 110), and a database level (e.g., databases accessed by the AUT during test execution). Additionally, in some examples, the test data may include data relating the particular test execution state, such as metadata related to the AUT (e.g., AUT version), the particular test execution state (e.g., test date/time, tester name, etc.), and testing actions and/or steps performed during the particular test execution state. Furthermore, in some examples, the environment data may include data related to the environment of the AUT and may include metadata related to hardware (e.g., device build, CPU usage, memory usage, resource usage, etc.) and programming (e.g., operating system, browser, etc.) that are related to the execution of the test of the AUT (e.g., server logs) and/or that relate to the execution of the AUT itself (e.g., application server errors). Examples of capturing data points during test executions of an AUT are described in further detail below with respect to, for example, FIGS. 2-8.

Data correlation instructions 244 may function to correlate data points. For example, when data correlation instructions 244 are executed by processor 220, data correlation instructions 244 may cause processor 220 to correlate each of the data points with a particular test execution state of the AUT. In some implementations, the data points may be correlated based on a sequence of events that occurred during the particular test execution state. For example, data correlation instructions 244 may cause processor 220 to generate a DAG and/or store the data in a manner that allows contextual queries of the data. In some examples, the DAG and/or the correlated data may be stored in a repository, such as verification repository 130. Examples of correlating data points are described in further detail below with respect to, for example, FIGS. 4, 5, and 7.

Test verification instructions 246 may function to verify, based on the correlation of the data points, an actual behavior of the AUT separately from the particular test execution state. For example, when test verification instructions 246 are executed by processor 220, test verification instructions 246 may cause processor 220 to verify an actual behavior of the AUT based on verification inputs (e.g., a natural language query) received either before a particular test execution, during the particular test execution, or after the particular test execution. For example, verification database 130 may include stored verifications that are defined either before a test execution corresponding with the particular test execution state, during the test execution, or after the test execution. In some implementations, the verification inputs are translated to into verifications (e.g., directed acyclic graph verification queries) using a domain-specific language and/or stored in a storage system, such as verification repository 130. Examples of verifying an actual behavior of the AUT separately from the particular test execution state are described in further detail below with respect to, for example, FIGS. 5 and 6.

Figure 3:
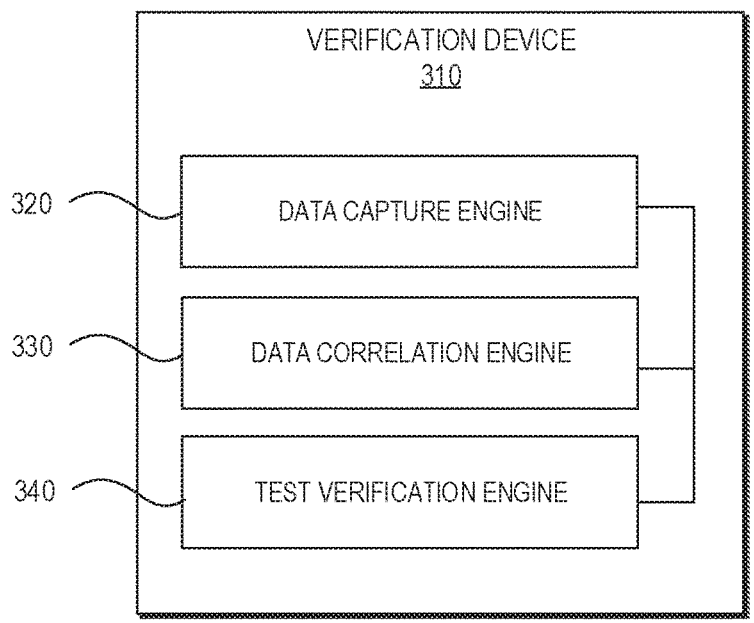
FIG. 3 is a block diagram of an example verification device consistent with disclosed implementations.

FIG. 3 is a block diagram of an example verification device 310 consistent with disclosed implementations. In certain aspects, verification device 310 may correspond to \verification device 110 of FIG. 1 and/or verification device 210 of FIG. 2. Device 310 may be implemented in various ways. For example, device 310 may be a special purpose computer, a server, a mainframe computer, and/or any other suitable type of computing device. In the example shown in FIG. 3, device 310 may include a data capture engine 320, a data correlation engine 330, and a test verification engine 340.

Engines 320, 330, and 340 may be electronic circuitry for implementing functionality consistent with disclosed examples. For example, engines 320, 330, and 340 may represent combinations of hardware devices and programming to implement the functionality consistent with disclosed implementations. In some examples, the functionality of engines 320, 330, and/or 340 may correspond to operations performed by verification device 210 of FIG. 2, such as operations performed when separation instructions 240 are executed by processor 220 (described above with respect to FIG. 2). In FIG. 3, data capture engine 320 may represent a combination of hardware and programming that performs operations similar to those performed when processor 220 executes data capture instructions 242. Similarly, data correlation engine 330 may represent a combination of hardware and programming that performs operations similar to those performed when processor 220 executes data correlation instructions 244, and test verification engine 340 may represent a combination of hardware and programming that performs operations similar to those performed when processor 220 executes test verification instructions 246.

Figure 4:
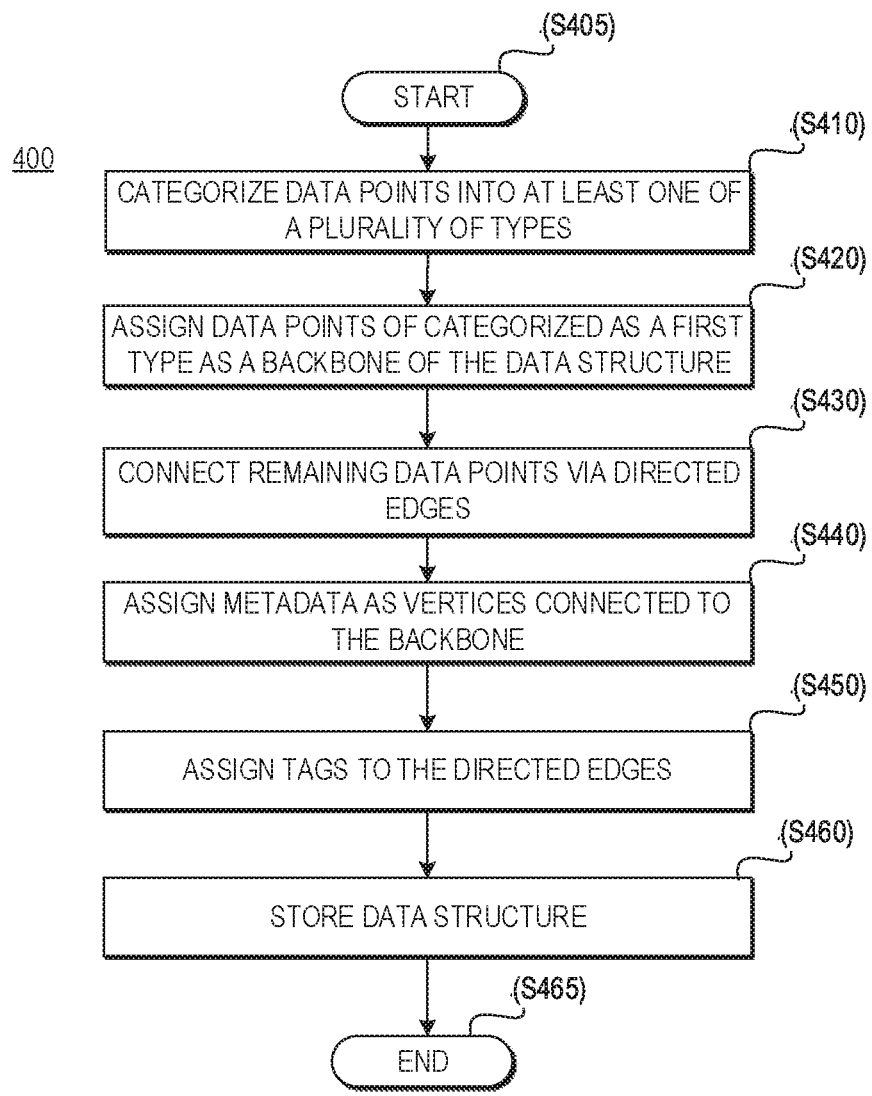
FIG. 4 is a flow chart of an example process for correlating data points consistent with disclosed implementations.

FIG. 4 is a flow chart of an example process 400 for correlating data points consistent with disclosed implementations. Although execution of process 400 is described below with reference to system 100 of FIG. 1 and/or specific components of system 100, other suitable systems and devices for execution of at least one step of process 400 may be used. For example, processes described below as being performed by verification device 110 may be performed by verification device 210, verification device 310, and/or any other suitable device. Process 400 may be implemented in the form of executable instructions stored on a machine-readable storage medium and/or in the form of electronic circuitry.

Process 400 may start (step S405) after data points have been captured during test executions of an AUT. Once the data points have been captured, process 400 may function to generate a DAG. For example, process 400 may include categorizing the data points into at least one of a plurality of types (step S410). For example, the data points may be categorized based on steps of the test execution, data type (e.g., CPU, memory; UI object, user action, network packet, etc.), a particular user (e.g., an identify of the user who was running the test), AUT build (the specific build version of the AUT when the data points were captured), and/or any other suitable categorization. Process 400 may also include generating a data structure including a backbone, where the backbone may include data points categorized as a first type of the plurality of types. For example, system 100 may assign data points of the first type (e.g., test steps of the test execution) as a backbone of the data structure (step S420).

Process 400 may also include connecting remaining data points (e.g., data points that aren't categorized as the first type) via directed edges based on timestamps associated with the remaining data points (step S430). For example, the data points may be connected via directed edges from a first data point of the first type (e.g., a first test step of the test steps). In some examples, the data points may be connected based on a length of time between a time stamp associated with a particular data point of the captured data points, and a time stamp associated with the first test step. For example, system 100 may order the test steps in the backbone sequentially based on when the test steps were executed. Events associated with a particular test step may be traced and associated with the particular test step. For example, system 100 may trace UI objects. A UI scanner may run periodically and automatically identify structured objects in the UI, their attributes, and their values. As another example, system 100 may trace system events associated with a particular test steps by implementing a thread event monitor that monitors threads for a creation of an object, the run of an object, the termination of an object, and the like, and associate the creation, run, and/or termination of objects to a particular test event based on thread and object identifiers.

Process 400 may also include assigning the metadata as vertices connected to the backbone (step S440). For example, system 100 may determine the elements of the backbone and may assign metadata traced to each particular element (e.g., each test step). For example, system 100 may trace the metadata based on time-relations (e.g., the event happened after a particular test step) or based on another suitable methodology (e.g., coloring network packets to trace them to a server code). Additionally process 400 may also include assigning tags to the directed edges to identify a type of relation between the vertices (step S450). In some implementations, system 100 may assign tags to the directed edges based on data received from the agents installed on the various physical or virtual system components. For example, the agents may include instructions, that when executed by a processor, compare an event occurring with the system to a list of rules. If the event matches a particular rule, the agent notes the tag association between events. For example, assume that the list of rules includes a use tagging rule that requires tagging a directed edge as "use" when a test step involves the usage of a browser. When a test step is executed that invokes an object named "browser," the agent may compare the invocation of the object to the list of rules and, based on the use tagging rule in the list, tag the directed edge as "use."

Process 400 may also include storing the data structure (step S460) in a storage device. In some implementations, the data structured may be stored in a storage device such as a non-transitory computer-readable storage medium, such as a machine-readable storage medium in verification device 110, verification repository 130, and/or in another device. After the data points have been categorized (step S410), the backbone of the data structure has been assigned (step S420), the remaining data points are connected (step S430), the metadata has been assigned as vertices (step S440), the tags have been assigned to the directed edges (step S450), and the data structure has been stored (step S460), process 400 may end (step S475).

Figure 5:
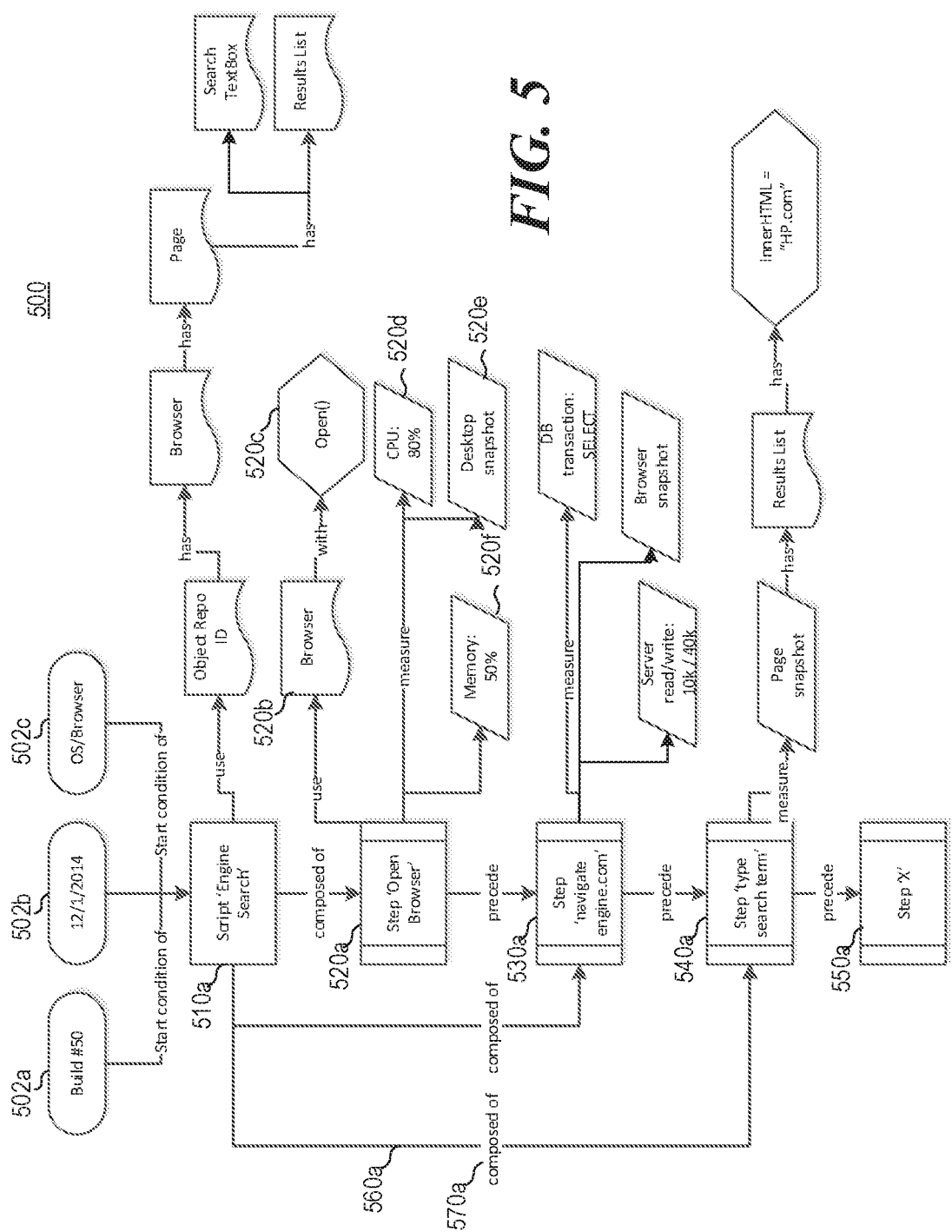
FIG. 5 is an example of a block diagram of a directed acyclic graph consistent with disclosed implementations.

FIG. 5 is an example of a block diagram of a DAG 500 consistent with disclosed implementations. For example, DAG 500 may represent data points captured during test executions of an AUT that have been correlated based on a sequence of events that occurred during a particular test execution state. Although the example DAG 500 is described below as being managed by, updated by, and/or otherwise utilized by system 100 of FIG. 1 and/or specific components of system 100, other suitable systems and devices for managing, updating, and/or otherwise utilizing DAG 500 may be used. For example, processes described below as being performed by verification device 110 may be performed by verification device 210, verification device 310, and/or any other suitable device. Processes performed with respect to DAG 500 may be implemented in the form of executable instructions stored on a machine-readable storage medium and/or by electronic circuitry As shown in FIG. 5, DAG 500 may include data related to one or more particular test executions of an AUT. In the example shown in FIG. 5, the data includes data points related to application data 502a (e.g., build number), test data (e.g., the date of the test) 502b, and environment data 502c (e.g., operating system and browser type). DAG 500 also includes a backbone (the collective of test steps 510a, 520a, 530a, 540a, and 550a) which serves as the anchor for each of the vertices in the DAG. In this example, the backbone is comprised of test steps performed during test executions of the AUT, but DAGs consistent with disclosed implementations may use any suitable categorization of the data points as the backbone. For example, the backbone may be comprised according to user actions, recorded AUT web pages, UI objects, and/or any other suitable categorization.

The backbone of DAG 500 is correlated based on a sequence of events that occurred during the particular test execution state, and thus the backbone links various ones of test steps 510a, 520a, 530a, 540a, and 550a together. In the example shown in FIG. 5, test step 510a occurred before test step 520a, test step 520a occurred before test step 530a, test step 530a occurred before test step 540a, and test step 540a occurred before test step S550a. Each portion of the backbone (e.g., each test step) in this example is connected via directed edges (only directed edge 660 has been labelled for clarity) from the first test step 510a of the test steps to the last test step 550a of the test steps, and the directed edges (only directed edge 560a has been labelled for clarity) have been tagged (only tag 570a has been labelled for clarity) to identify a type of relation between the vertices. For example, test step 510a is directly linked with test steps 520a, 530a, and 540a via the directed edges, and the cause and/or effect of the linkage is shown in the tagging. For example, test step 510a is composed of test steps 520a, 530a, and 540a, test step 520a precedes test step 530a, test step 530a precedes test step 540a, and test step 550a precedes test step 540a.

Furthermore, each test step in DAG 500 has additional information that was captured from the testing and/or application environment and was correlated with the particular test step. This additional information was assigned as vertices (only vertices 520b, 520c, 520d, 520e, and 520f have been labelled for clarity) connected to the backbone. For example, test step 520a relates to opening a browser. In this case, the step of opening the browser included using the browser (an object) and it was used with a specific action (in this case open). Thus, during this particular test execution state the browser was automatically opened by calling the open function of the browser. This information is modelled in DAG 500 not only by linking the test steps and what follows in terms of the AUT and the environment, but also by the tags that essentially indicate the conceptual meaning of those steps.

Figure 6:
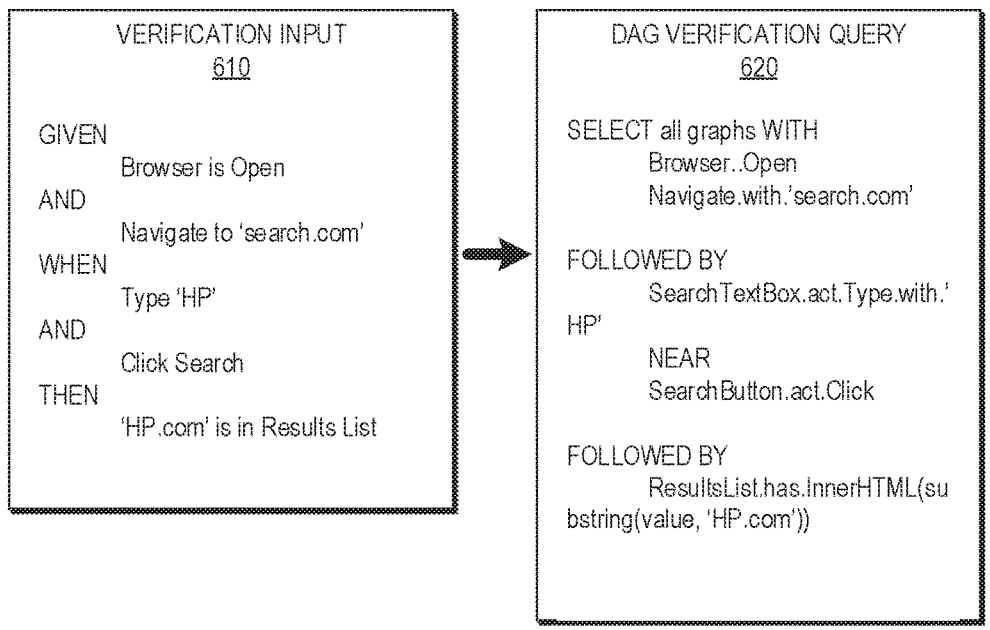
FIG. 6 is an example of a translation of a verification input into a directed acyclic graph verification query consistent with disclosed implementations.

FIG. 6 is an example of a translation of a verification input 610 into a directed acyclic graph verification query 620 consistent with disclosed implementations. Although the example translation is described below as being performed by system 100 of FIG. 1 and/or specific components of system 100, other suitable system and devices for translating the verification input may be used. For example, processes described below as being performed by verification device 110 may be performed by verification device 210, verification device 310, and/or any other suitable device. Processes performed with respect translating verification input 610 may be implemented in the form of executable instructions stored on a machine-readable storage medium and/or by electronic circuitry.

Verification device 110 may generate a user interface to be displayed to a user on a display device. A user may enter a verification input that defines how verification device 110 will be queried. For example, the verification input may be a series of conditional statements, questions, or any other suitable input. In the example shown in FIG. 6, verification input 610 relates to determining data points from multiple test executions of a single or of multiple AUTs that correspond with the test steps of opening a browser, navigating to "search.com," typing in HP, clicking search, and subsequently having "HP.com" in the search results list. Additionally, the verification input (e.g., verification input 610) may be entered into the user interface using a domain-specific language (e.g., a computer language specialized to verification device 110) and/or any other input (e.g., natural language) that may be translated by verification device 110 into DAG verification query 620 (e.g., a query capable of obtaining relevant information from a DAG, such as DAG 500 of FIG. 5) using a domain-specific language by verification device 110. In some implementations, the domain-specific language may be similar to behavior-driven-development syntax.

The DAG verification query (e.g., DAG verification query 620) may be stored as a verification in a verification repository, such as verification repository 130. The verification repository may include a number of stored verifications, where each of the stored verifications are defined either before a test execution corresponding with the particular test execution state, during the test execution, or after the test execution. For example, a verification (e.g., a directed acyclic graph verification query) may be stored in a storage device (e.g., verification repository 130) after a first particular test execution state of an AUT but before a second particular test execution state of the AUT. If the second particular test execution state changes the results of the query from those obtained after the first particular test execution state, verification device 110 may cause the generate an alert to be displayed by a display device. The alert may contain information regarding the difference between the verification after the first particular test execution state and after the second particular test execution state. As another example, verification device 110 may automatically execute one or more of the verifications in the storage device (e.g., in the verification repository) by automatically executing the verifications at a particular point in time. In some implementations, the particular point in time may be based on a schedule and verification device 110 (e.g., a test verification engine of verification device 110) may automatically report on the execution of the verifications.

Figure 7:
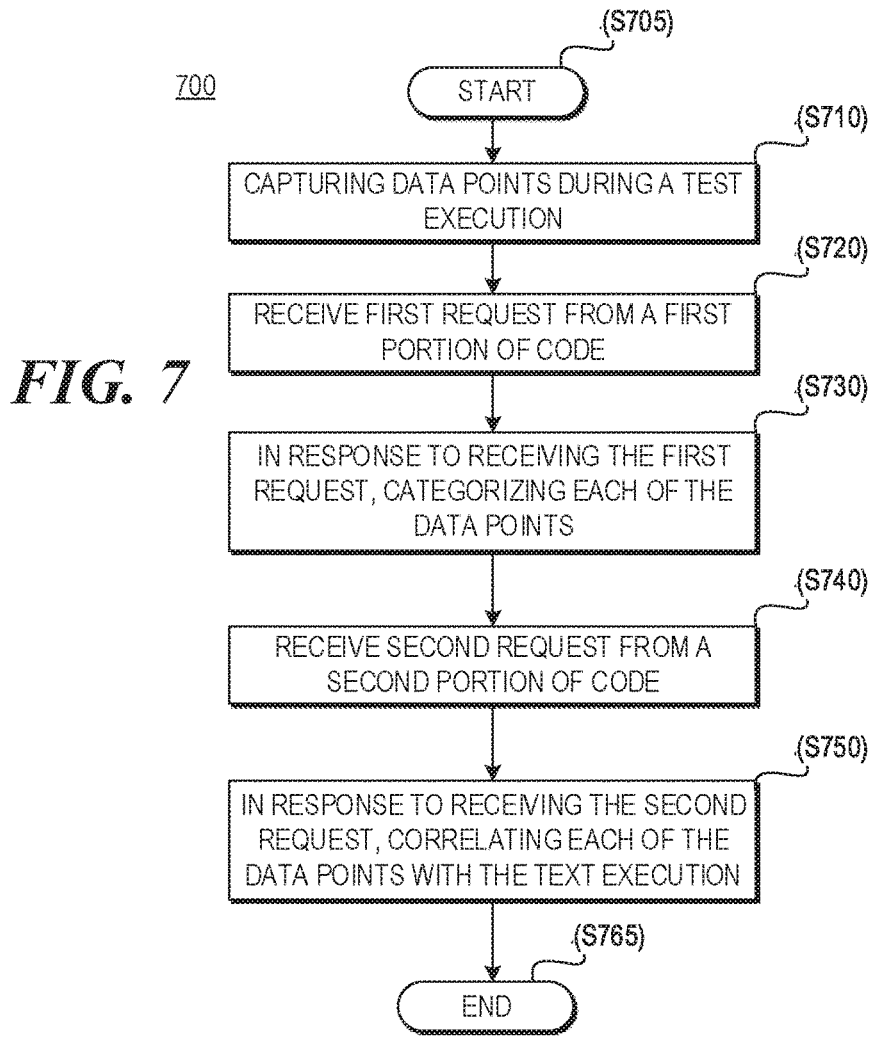
FIG. 7 is a flow chart of an example process for separating test verifications from test executions consistent with disclosed implementations.

FIG. 7 is a flow chart of an example process 700 for separating test verifications from test executions consistent with disclosed implementations. Although execution of process 700 is described below with reference to system 100 of FIG. 1 and/or specific components of system 100, other suitable systems and devices for execution of at least one step of process 700 may be used. For example, processes described below as being performed by verification device 110 may be performed by verification device 210, verification device 310, and/or any other suitable device. Process 700 may be implemented in the form of executable instructions stored on a machine-readable storage medium and/or in the form of electronic circuitry.

Process 700 may start (step S705) at or near the beginning of a test execution of an AUT. Process 700 may include capturing, via a processor, data points during the test execution of the AUT (step S710). As discussed above, the data points may include metadata associated with the test execution, the AUT, and an environment of the AUT. Process 700 may also include receiving, via the processor, a first request from a first portion of code to categorize each of the data points into at least one of a plurality of types (step S720). In some implementations, a component(s) of system 100 may transmit the first request to verification device 110. For example, when the first portion of code is executed by a processor, the first portion of code may cause the processor to transmit the first request to verification device 110. In response to receiving the first request, verification device 110 may categorize, via the processor, each of the data points into at least one of the plurality of types (step S730). For example, verification device 110 may categorize each of the data points using one or more of the methods described above.

Process 700 may also include receiving, via the processor, a second request from a second portion of code to correlate each of the captured data points with the test execution of the AUT (step S740). In some implementations, a component(s) of system 100 may transmit the second request to verification device 110. For example, when the second portion of code is executed by a processor, the second portion of code may cause the processor to transmit the second request to verification device 110. In response to receiving the second request, verification device 110 may correlate, via the processor, each of the captured data points with the test execution of the AUT. For example, the data points may be correlated as described above (e.g., by generating a DAG). In some examples, the data points may be correlated by: generating, via the processor, a data structure including a backbone, the backbone including data points categorized as a first type of the plurality of types; connecting, via the processor, remaining data points via directed edges based on timestamps associated with the remaining data points, the remaining data points being data points not categorized as the first type; and assigning tags to the directed edges to identify a type of relation between the vertices. Once the data points have been correlated, process 700 may end (step S765).

The actual behavior of the AUT may be verified based on the correlated data points. For example, in some implementations, system 100 may receive, via the processor, a third request from a third portion of code to verify an actual behavior of the AUT, where the third request is received from a verification component that differs from a test component that perform the test execution. For example, if test execution is being performed on client device 120, the third request may be received from one or more components of verification device 110. In other words, the test execution may be performed separately from the verification.

In response to receiving the third request, system 100 may query a verification repository, such as verification repository 130, to obtain at least a portion of the correlated captured data points that are responsive to the query. For example, system 100 may query the verification repository using one or more of the processes and/or components discussed above, and receive the at least the portion of the correlated captured data points that are responsive to the query. In some examples, system 100 may also cause a display of at least the portion of the correlated captured data points that are responsive to the query on a display device. For example, as discussed above, system 100 may generate an alert. The alert may be displayed on a display device associated with client device 120 and/or on any other suitable device. The alert may display the data points that are relevant to the query.

Figure 8:
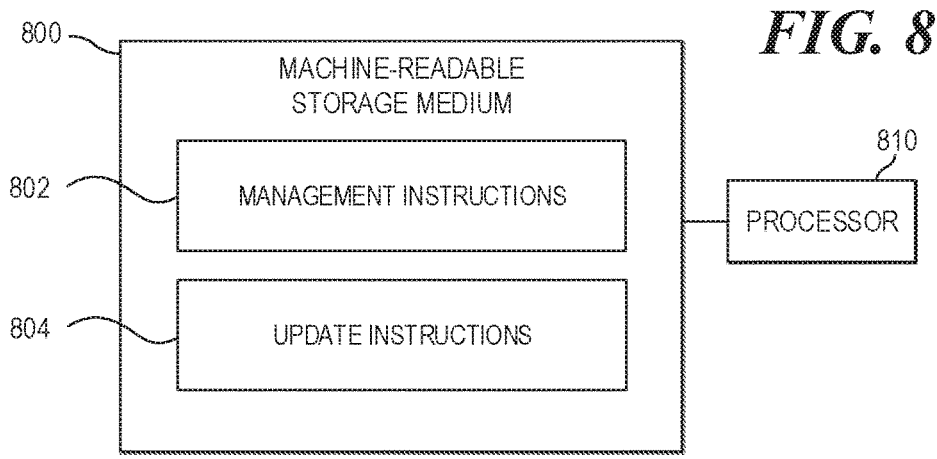
FIG. 8 is a block diagram of an example machine-readable storage medium consistent with disclosed implementations.

FIG. 8 is a block diagram of an example machine-readable storage medium 800 consistent with disclosed implementations. In certain aspects, machine-readable storage medium 800 may correspond with storage devices associated with system 100, verification device 210, verification device 310, and/or any other suitable storage device. Machine-readable storage medium 800 may be any electronic, magnetic, optical, or other physical storage device that stores executable instructions. Thus, machine-readable storage medium 800 may be, for example, memory, a storage drive, an optical disc, and the like. In some implementations, machine-readable storage medium 800 may be a non-transitory computer-readable storage medium, where the term "non-transitory" does not encompass transitory propagating signals. Machine-readable storage medium 800 may be encoded with instructions that, when executed by a processor 810, perform operations consistent with disclosed implementations. For example, machine-readable storage medium 800 may include instructions that perform operations to manage the storage of the data structure, such as the storage of the data structure in step S460 of FIG. 4. In the example shown in FIG. 8, machine-readable storage medium 800 may include management instructions 802 and update instructions 804.

Management instructions 802 may function to manage a DAG (e.g., a data structure) stored on a storage device. For example, when management instructions 802 are executed by processor 810, management instructions 802 may cause processor 810 to manage a data structure including a backbone that comprises test steps of a first test execution of an AUT. In some examples, each test step of the backbone may be connected via directed edges with data points captured during the test execution. Furthermore, each test step of the backbone may be connected based on timestamps associated with the data points. In some examples, the data structure may also include vertices connected to the backbone, where the vertices are modeled by metadata associated with the test execution. Furthermore, in some examples, the data structure may include tags associated with the directed edges that identify a type of relation between the vertices. Furthermore, in some examples, the management of the data structure may include receipt of a query to access the data structure (e.g., a query including verification information to verify the actual behavior of the AUT) and transmitting information that is responsive to the query.

The management of the data structure may be implemented in various ways. In some examples, system 100 may create the data structure each time a test is executed. In some examples, system 100 may create and/or update the data structure in a bulk operation by creating a temporary data structure to store the correlations between data points. The temporary data structure may be the same as, similar to, or different from the data structure.

Update instructions 804 may function to update the data structure based on additional test executions of the AUT. For example, when update instructions 804 are executed by processor 810, update instructions 804 may cause processor 810 to update the data structure to include additional DAGs generated based on additional test executions (e.g., based on a second test execution) of the AUT (and/or a different AUT). These additional test executions may have been performed after the creation of the original data structure.

The disclosed examples may include systems, devices, machine-readable storage media, and methods for separating test verifications from test executions. For purposes of explanation, certain examples are described with reference to the components illustrated in FIGS. 1-8. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are only used to distinguish one element from another.

Further, the sequence of operations described in connection with FIGS. 1-8 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-8. Thus, the present disclosure merely sets forth possible examples of implementations, and many variations and modifications may be made to the described examples. All such modifications and variations are intended to be included within the scope of this disclosure and protected by the following claims.

We claim:

1. A system for separating test verifications from test executions comprising:
 a processor; and
 a computer-readable storage medium on which is stored instructions that, when executed by the processor, cause the processor to:
  capture data points during test executions of an application under test, the data points including application data, test data, and environment data;

correlate each of the data points with a particular test execution state of the application under test, each of the data points being correlated based on a sequence of events that occurred during the particular test execution state, wherein the instructions to correlate each of the data points are further to cause the processor to:
assign test steps of a test execution as a backbone of a data structure;
connect the data points via directed edges from a first test step of the assigned test steps;
assign the application data, the test data, and the environment data as vertices connected to the backbone; and
assign tags to the directed edges to identify a type of relation between the vertices; and
verify, based on the correlation of the data points, an actual behavior of the application under test separately from the particular test execution state.

2. The system of claim 1, wherein:
the application data includes data related to various levels of the application under test, the levels including at least one of a user interface level, a code level, a network communication level, and a database level;
the test data includes data related to the particular test execution state, the test data including metadata related to the application under test, to the particular test execution state, and to testing actions performed during the particular test execution state; and
the environment data includes data related to the environment of the application under test, the environment data including metadata related to hardware and programming that execute the application under test.

3. The system of claim 1, wherein the instructions are further to cause the processor to:
correlate the data points based on a length of time between a time stamp associated with a particular data point and a time stamp associated with the first test step.

4. The system of claim 1, wherein the instructions are further to cause the processor to:
verify the actual behavior based on a verification input received after the particular test execution state.

5. The system of claim 4, wherein the instructions are further to cause the processor to:
correlate each of the data points by generating a directed acyclic graph, the directed acyclic graph being generated based on timestamps associated with the data points;
translate the verification input to a directed acyclic graph verification query, the directed acyclic graph verification query being translated using a domain-specific language; and
query the directed acyclic graph using the directed acyclic graph verification query.

6. The system of claim 5, wherein:
the particular test execution state is a first particular test execution state;
the directed acyclic graph verification query is stored in a storage device before a second particular test execution state; and
based on the second particular test execution state changing results of the query, the instructions are further to cause the processor to generate an alert.

7. The system of claim 1, further comprising:
a verification repository that stores verifications,
wherein the instructions are further to cause the processor to verify the actual behavior of the application under test by automatically executing the verifications at a particular point in time.

8. The system of claim 7, wherein the instructions are further to cause the processor to:
automatically report on the execution of the verifications, wherein the particular point in time is based on a schedule.

9. The system of claim 7, wherein the instructions are further to cause the processor to:
define each of the stored verifications before the test execution corresponding with the particular test execution state, during the test execution, or after the test execution.

10. A computer-implemented method comprising:
capturing, via a processor, data points during a test execution of an application under test, the data points including metadata associated with the test execution, the application under test, and an environment of the application under test;
receiving, via the processor, a first request from a first portion of code to categorize each of the captured data points into at least one of a plurality of types;
in response to receiving the first request, categorizing, via the processor, each of the captured data points into at least one of the plurality of types;
receiving, via the processor, a second request from a second portion of code to correlate each of the captured data points with the test execution of the application under test; and
in response to receiving the second request, correlating, via the processor, each of the captured data points with the test execution of the application under test, wherein correlating each of the captured data points comprises:
generating, via the processor, a data structure including a backbone, the backbone including data points categorized as a first type of the plurality of types;
connecting, via the processor, remaining data points via directed edges based on timestamps associated with the remaining data points, the remaining data points being data points not categorized as the first type; and
assigning tags to the directed edges to identify a type of relation between vertices.

11. The computer-implemented method of claim 10 comprising:
receiving, via the processor, a third request from a third portion of code to verify an actual behavior of the application under test, the third request being received from a verification component that differs from a test component that performs the test execution; and
in response to receiving the third request, querying a verification repository to obtain at least a portion of the correlated captured data points that are responsive to the query.

12. The computer-implemented method of claim 11 comprising:
receiving the at least the portion of the correlated captured data points that are responsive to the query; and
causing a display of the at least the portion of the correlated captured data points that are responsive to the query on a display device.

13. The computer-implemented method of claim 11, wherein correlating each of the captured data points comprises generating a directed acyclic graph.

14. A non-transitory computer-readable storage medium including instructions which, when executed by a processor, cause the processor to:
- manage a data structure stored on a storage device, the data structure including:
  - a backbone comprising test steps of a first test execution of an application under test, each test step of the backbone being connected via directed edges with data points captured during the first test execution, each test step of the backbone being connected based on a sequence of events associated with the data points;
  - vertices connected to the backbone, the vertices being modeled by metadata associated with the first test execution; and
  - tags associated with the directed edges, the tags identifying a type of relation between the vertices; and
- update the data structure based on a second test execution.

15. The non-transitory computer-readable storage medium of claim 14, wherein managing the data structure includes:
- receiving a query to access the data structure, the query including verification information to verify an actual behavior of the application under test; and
- transmitting information from the data structure that is responsive to the query.

* * * * *